Aug. 20, 1957      H. ULFFERS      2,803,163
ILLUMINATING SYSTEM FOR PICTURE PROJECTORS
Filed May 18, 1953
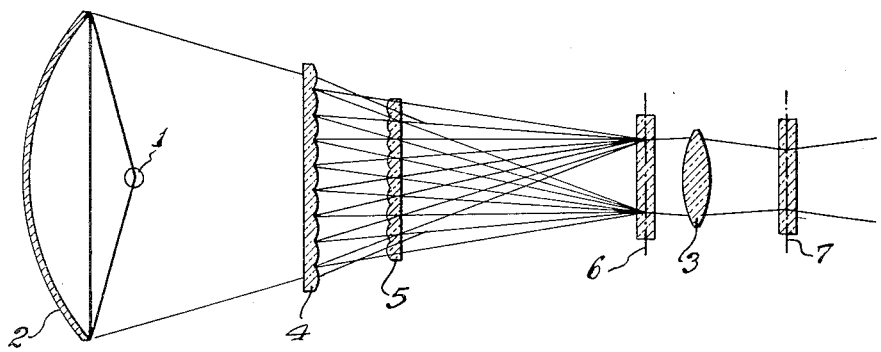
Inventor
Heinz Ulffers
by Singer, Stern & Carlberg
Attorneys

United States Patent Office 2,803,163
Patented Aug. 20, 1957

2,803,163

ILLUMINATING SYSTEM FOR PICTURE PROJECTORS

Heinz Ulffers, Kiel-Wik, Germany, assignor to Zeiss Ikon A. G., Stuttgart, Stuttgart, Germany Application May 18, 1953, Serial No. 355,433

Claims priority, application Germany May 20, 1952

6 Claims. (Cl. 88—24)

The invention relates to an illuminating device for picture projectors and particularly is directed to an illuminating device provided with a honeycomb condenser consisting of a light field lens screen plate and a picture field lens screen plate, as preferably employed for projection devices.

In the projection and illumination art, the problem frequently encountered is to vary the brightness and/or the color of the projection light. Among the great number of possibilities of employing such a control, principally in the filed of photography and the taking or the projection of motion pictures, there may be mentioned here, as an example, the projectors of copying plants since these plants produce for motion picture theaters of different classes copies of motion picture films having different densities, and it is desirable to project these copies during examination in the copying plant with different densities of light.

In color films, there must also be judged the effect of the copies when projected with light of different color temperatures—for instance, with Beck light, pure carbon light, or incandescent light. In order to avoid complicated reconstructions—for instance, the employment of different projectors—it is desirable that all necessary changes in the brightness or color, respectively, of the projection light can be made with the same projector.

Heretofore, changes in the brightness, or in the color, were produced by arranging diaphragms, or color filters, in the picture plane of the projection objective. In such an arrangement there occurs, however, a strong heat absorption adjacent the sensitive lenses of the objective, so that it is often impossible, without considerable reconstruction of the arrangement, to arrange the control device exactly in the picture plane. For this reason, for instance, a continuous control of the color tone is very frequently connected with great difficulties, and one prefers to employ correctly matched color filters which cover the total cross section of the beam of light used for illumination. Furthermore, by means of diaphragms on the lens system the effective aperture is changed, which results, however, under certain circumstances in undesirable changes in the gradation or illumination of the projected pictures.

It is an object of the invention to provide an illuminating device which is combined with a honeycomb condenser consisting of a light field lens screen plate and a picture field lens screen plate. Such as illuminating system avoids the disadvantages of the prior art, in that the means influencing or controlling the rays or their brightness and/or their color, respectively, is positioned in one of the picture diaphragm planes of the intermediate images of the honeycomb condenser.

In accordance with the invention, the honeycomb condenser—consisting of a picture field lens screen plate and a light field lens screen plate—constitutes a multiple projecting system for intermediate images. Each individual lens of the picture field lens screen plate projects an image of the source of light into the corresponding individual lens of the light field lens screen plate. Each lens of this lens screen plate projects an image of its corresponding individual lens of the picture field lens screen plate into the picture plane in which the images of all individual lenses of the picture field lens screen are superimposed. Furthermore, the optical system arranged behind the light field lens screen projects an image of the light field lens screen plate into a conjugate plane on the opposite side of the objective so that a number of intermediate images are produced which are available for the means which influence or control the beam of light, which means, for instance, may consist of diaphragms or color filters. Of these intermediate image planes, those planes are particularly suitable for the insertion of such means which serve as aperture diaphragms—namely, the plane of the light field lens screen itself and its projected conjugated plane.

Diaphragms for decreasing the light and which are arranged in the plane of the light field lens screen should preferably not be made in the form of metallic aperture diaphragms because in view of their strong heat absorption property they may injure the lens screen plate through local overheating.

Another object of the invention is to employ these diaphragms in the form of dispersion discs made of ground glass. By employing dispersion discs with different penetration—if necessary combined with diaphragms which cover the path of the rays partially or completely, the light reduction may be controlled within wide limits. In this manner, the dispersed light is distributed over a large space angle so that amounts of heat produced by the absorption may be conducted away without difficulty. A particular advantage of these dispersion discs consists in this that the illuminating system need not be changed, which would be necessary if apertured diaphragms were used.

The positioning of dispersion discs in the plane in which the objective projects an image of the light field lens screen would disturb the projection. Without changing the construction of the projecting device, it is possible to employ apertured diaphragms at this place, because the cooling of such diaphragms at this point, which lies outside the objective, is very simple. A change of the projection system by means of employing apertured diaphragms in this plane is admissible.

When it is necessary to employ color filters for influencing or controlling the projection light, one may use filters of lower optical quality in the plane of the light field lens screen, because the same do not lie in the path of the light beam of the picture to be projected. In the plane of the projected image of the light field lens screen, however, there are suitably employed high quality color filters, preferably with strong saturated colors, because the same are inserted in the paths of the light beam only partially for obtaining the desired color tone. When color filters are arranged in this plane of projection, it is possible to obtain conveniently continuous changes of the color tone—for instance, by employing the color temperature variation differently energized Beck arcs. Furthermore, the losses of light, for instance, due to reflection are less, since only a part of the cross section of light beam need to be covered by the color filters.

For producing a uniform control of the illumination in the picture plane, the diaphragms or color filters, respectively, are preferably made in a plurality of parts, so that the insertion of these control members in the path of the rays may take place symmetrically with respect to the optical axis.

If the problem consists in changing the brightness and the color tone at the same time and independent of each other, the device—according to the invention—permits the arrangement of the diaphragm in the plane of the image of the light field lens screen while the color filter is arranged in the plane conjugated to the plane of the light field lens screen.

It has also been proposed already to subdivide the beam of light of an illuminating device by lens screens into elementary light pencils. The light of these elementary light pencils is, however, not superimposed at any point of the path of light as it is the case in devices which employ a honeycomb condenser. In order to obtain with the mentioned known devices a control of the path of light as is done in accordance with the present invention, such a control would have to be inserted in each of the individual paths of rays. If the adjusting device does not operate completely uniformly in each elementary light path, there would occur non-uniformities in the brightness, or in the color tone, respectively, of the illuminated area. According to the device of the present invention, however, such non-uniformity cannot occur because of the complete mixing of all individual paths of rays with each other.

The accompanying drawing illustrates diagrammatically one embodiment of the present invention.

The source of light 1 is projected by the mirror 2 toward the projection objective 3 and passes thereby through the picture field lens screen plate 4 and the light field lens screen plate 5. Each individual lens of the picture field lens screen plate projects an image of the source of light 1 onto its corresponding lens of the light field lens screen plate. The lenses of the light field lens screen project an image of the lenses of the picture field lens screen plate in the plane 6 in which the picture gate is arranged. The objective 3 projects an image of the light field lens screen plate in the plane 7.

According to the invention, the diaphragms and/or color filters are inserted in the path of light at the points where the planes 6 and 7 are positioned.

What I claim is:

1. In an illuminating system for picture projectors, a source of light, an objective, means for reflecting light rays from said source of light toward said objective, a honeycomb condenser comprising a light field lens screen plate and a picture field lens screen plate disposed between said source of light and said objective to project a first intermediate image of the honeycomb condenser in a plane between said honeycomb condenser and said objective and a second intermediate image of the honeycomb condenser in a conjugate plane on the opposite side of said objective from the honeycomb condenser, and light ray control means positioned in said conjugate plane.

2. An illuminating system as in claim 1, in which said light ray control means are made of a plurality of parts in such a manner that their insertion into the path of the rays takes place symmetrically with respect to the optical axis.

3. An illuminating system as in claim 1, in which said light ray control means include diaphragm means for controlling the brightness of the picture.

4. An illuminating system as in claim 3, in which the diaphragm means consist of dispersion plates made of ground glass.

5. An illuminating system as in claim 1, in which said light rays control means include color filters for controlling the color balance of the pictures.

6. An illuminating system as in claim 5, in which said color filters have a strongly saturated color tone.

References Cited in the file of this patent

UNITED STATES PATENTS

| | | |
|---|---|---|
| 1,342,894 | Bugbee | June 8, 1920 |
| 1,633,228 | Rogers | June 21, 1927 |
| 2,183,249 | Schering et al. | Dec. 12, 1939 |
| 2,186,123 | Rantsch et al. | Jan. 9, 1940 |
| 2,225,485 | Rantsch | Dec. 17, 1940 |
| 2,238,008 | Beck et al. | Apr. 8, 1941 |
| 2,270,517 | Drucker | Jan. 20, 1942 |
| 2,326,970 | Rantsch | Aug. 17, 1943 |
| 2,552,185 | Koch | May 8, 1951 |